(12) United States Patent
Patel et al.

(10) Patent No.: US 10,840,754 B2
(45) Date of Patent: Nov. 17, 2020

(54) METHOD OF PRODUCING A PERMANENT MAGNET MACHINE

(71) Applicant: Hamilton Sundstrand Corporation, Charlotte, NC (US)

(72) Inventors: Dhaval Patel, Loves Park, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 163 days.

(21) Appl. No.: 16/031,841

(22) Filed: Jul. 10, 2018

(65) Prior Publication Data
US 2018/0323666 A1     Nov. 8, 2018

Related U.S. Application Data

(62) Division of application No. 15/097,813, filed on Apr. 13, 2016, now Pat. No. 10,044,238.

(51) Int. Cl.
| | |
|---|---|
| *H02K 15/02* | (2006.01) |
| *H02K 1/27* | (2006.01) |
| *H02K 15/03* | (2006.01) |
| *H02K 1/02* | (2006.01) |

(52) U.S. Cl.
CPC ............... *H02K 1/274* (2013.01); *H02K 1/02* (2013.01); *H02K 1/276* (2013.01); *H02K 15/03* (2013.01); *Y10T 29/49012* (2015.01)

(58) Field of Classification Search
CPC ........ H02K 1/276; H02K 15/03; H02K 21/14; H02K 1/2793; H02K 1/2706; H02K 37/125; F05B 2220/7068; Y10T 29/49012; Y10T 29/53143

USPC .......... 29/598, 596, 604, 607, 608, 609, 732
See application file for complete search history.

(56) References Cited

U.S. PATENT DOCUMENTS

| | | | |
|---|---|---|---|
| 6,655,004 B2 | 12/2003 | Stuart et al. | |
| 6,856,051 B2 | 2/2005 | Reiter, Jr. et al. | |
| 6,876,119 B2 * | 4/2005 | Sasaki ................... | H02K 1/276 310/156.53 |
| 7,923,881 B2 * | 4/2011 | Ionel ..................... | H02K 21/46 310/156.53 |
| 2003/0062790 A1 | 4/2003 | Reiter et al. | |
| 2003/0192169 A1 | 10/2003 | Reiter et al. | |

(Continued)

FOREIGN PATENT DOCUMENTS

| | | |
|---|---|---|
| DE | 102011109129 A1 | 1/2013 |
| EP | 1300208 A2 | 4/2003 |
| JP | 2014093803 A | 5/2014 |

OTHER PUBLICATIONS

Extended European Search Report dated Aug. 21, 2017, issued during the prosecution of European Patent Application No. EP 17163054.4 (8 pages).

(Continued)

*Primary Examiner* — Thiem D Phan
(74) *Attorney, Agent, or Firm* — Locke Lord LLP; Joshua L. Jones; Scott L. Jones

(57) ABSTRACT

A permanent magnet machine includes a rotor including a rotor hub and a plurality of permanent magnets embedded in the rotor in a circumferential pattern. The rotor includes a respective bridge between each circumferentially adjacent pair of the permanent magnets. Each bridge is of a different material than that of the rotor hub, and the rotor hub and bridges are integral with one another.

10 Claims, 2 Drawing Sheets

(56) References Cited

U.S. PATENT DOCUMENTS

2015/0179320 A1 6/2015 Furusawa et al.
2015/0244214 A1 8/2015 Kreidler et al.
2017/0302115 A1 10/2017 Patel et al.

OTHER PUBLICATIONS

European Communication Pursuant to Article 94(3) EPC, dated Apr. 17, 2019, issued during the prosecution of European Patent Application No. EP 17163054.4.

\* cited by examiner

METHOD OF PRODUCING A PERMANENT MAGNET MACHINE

CROSS-REFERENCE TO RELATED APPLICATIONS

This application is a divisional of U.S. patent application Ser. No. 15/097,813 filed Apr. 13, 2016 the contents of which is incorporated by reference herein in its entirety.

BACKGROUND OF THE INVENTION

1. Field of the Invention

The present disclosure relates to electrical machines, and more particularly to rotor hubs such as used in electrical generators, motors, and the like.

2. Description of Related Art

Rotors for permanent magnet (PM) machines generally come in two types, namely surface mount permanent magnet rotors and interior permanent magnet motors. For surface mount rotors, the magnets are installed on the surface of a magnetic steel rotor hub and a band is installed around the assembly to keep the magnets in position. For interior permanent magnet rotors, permanent magnets are embedded within the rotor of the machine which eliminates the necessity of the band and can have numerous advantages over surface mount PM machines.

There are many configurations for interior PM rotors, with different advantages and disadvantages for each. All configurations have a bridge section between each magnet that exists to mechanically hold the rotor together. The bridge sections, while structurally necessary, are pathways for magnetic flux leakage, where the magnetic flux between magnets effectively short circuits from magnet to magnet rather than crossing the air gap to the stator. This leakage flux represents a portion of the magnetic flux that does not perform useful work for the machine. The sizing of rotor bridges is therefore a critical design task—it must be small enough to minimize flux leakage, yet large enough to provide the structural strength necessary to hold the rotor together. Traditional PM rotors therefore must accommodate the leakage flux.

Such conventional methods and systems have generally been considered satisfactory for their intended purpose. However, there is still a need in the art for improved PM machine rotors. The present disclosure provides a solution for this need.

SUMMARY OF THE INVENTION

A permanent magnet machine includes a rotor including a rotor hub and a plurality of permanent magnets embedded in the rotor in a circumferential pattern. The rotor includes a respective bridge between each circumferentially adjacent pair of the permanent magnets. Each bridge is of a different material than that of the rotor hub, and the rotor hub and bridges are integral with one another.

The rotor can include a respective transition region between each bridge and the rotor hub wherein the material of the bridge transitions into that of the rotor hub. The rotor can include a respective pole portion radially outward of each permanent magnet and circumferentially between each pair of circumferentially adjacent bridges, wherein the pole portion is of a different material from the bridges. The rotor can include a respective transition region between each bridge and each pole portion circumferentially adjacent to the bridge, wherein the material of the bridge transitions into that of the pole portion. It is contemplated that the rotor and magnets can be such that there are no gaps between the magnets and the rotor.

The bridges can be of a material with lower magnetic permeability than that of the rotor hub. The bridges can be of a material with lower magnetic permeability than that of the pole portions. The pole portions and the rotor hub can be of a common material. The bridges can be of a material including at least one of Inconel, titanium, stainless steel, or nickel. The rotor hub can be of a magnetic steel.

A method of producing a permanent magnet machine includes additively manufacturing a rotor including a rotor hub and a plurality of bridges radially outward of the rotor hub, wherein each bridge is of a different material than that of the rotor hub, and wherein the rotor hub and bridges are additively manufactured integral with one another.

In embodiments, additively manufacturing the rotor includes building the rotor up around a plurality of magnets so the magnets become embedded in the rotor. It is also contemplated that in embodiments, additively manufacturing the rotor includes building the rotor up without any magnets in place, and includes embedding a plurality of magnets in the rotor after the rotor has been additively manufactured.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
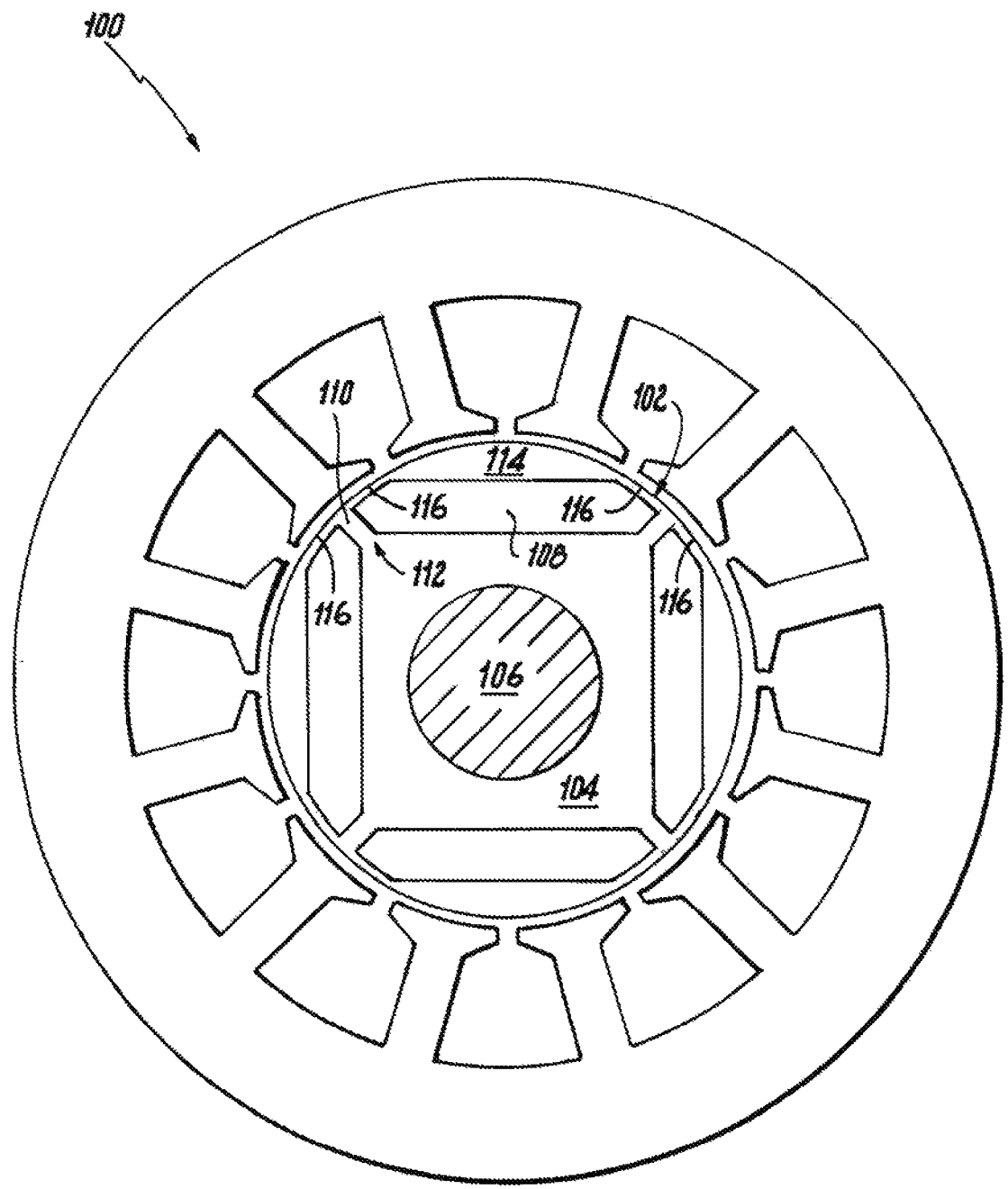
FIG. 1 is a schematic cross-sectional end view of an exemplary embodiment of a PM machine constructed in accordance with the present disclosure, showing the stator and the rotor.

Reference will now be made to the drawings wherein like reference numerals identify similar structural features or aspects of the subject disclosure. For purposes of explanation and illustration, and not limitation, a partial view of an exemplary embodiment of a permanent magnet machine in accordance with the disclosure is shown in FIG. 1 and is designated generally by reference character 100. Other embodiments of a permanent magnet machine in accordance with the disclosure, or aspects thereof, are provided in FIG. 2, as will be described. The systems and methods described herein can be used for improved performance in permanent magnet machines.

Permanent magnet machine 100 includes a rotor 102 including a rotor hub 104, e.g., mounted for rotation about a shaft 106. A plurality of permanent magnets 108 are embedded in the rotor 102 in a circumferential pattern. The rotor 102 includes a respective bridge 110 between each circumferentially adjacent pair of the permanent magnets 108. Each bridge 102 is of a different material than that of the rotor hub, and the rotor hub and bridges are integral with one another. The rotor 102 includes a respective transition region 112 between each bridge 110 and the rotor hub 104 wherein the material of the bridge 110 transitions into that of the rotor hub 102.

Figure 2:
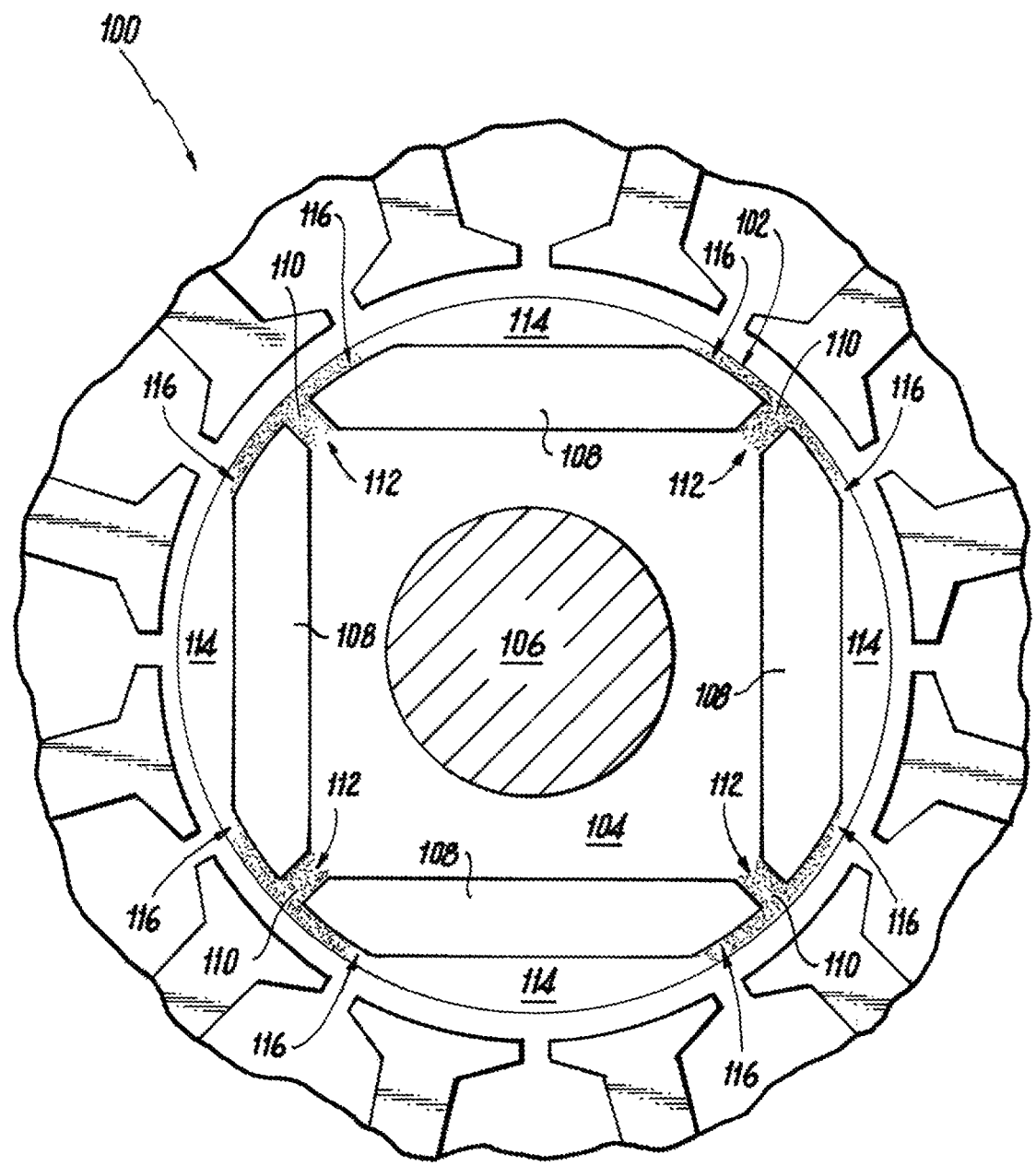
FIG. 2 is a schematic cross-sectional end view of the rotor of FIG. 1, showing the bridges.

With reference now to FIG. 2, the rotor 102 includes a respective pole portion 114 radially outward of each permanent magnet 108 and circumferentially between each pair of circumferentially adjacent bridges 110. The pole portions 114 are of a different material from the bridges 110, and the rotor 102 includes a respective transition region 116 between each bridge 110 and each pole portion 114 circumferentially adjacent the bridge 110, wherein the material of the bridge 110 transitions into that of the pole portion 114. The pole portions and the rotor hub are of a common material. The pole portions 110, bridges 110, and rotor hub 102 embed the magnets 108 within rotor 102, and optionally, there are no gaps between the magnets 108 and the rotor 102 to provide a more compact permanent magnet machine at a given power level than when gaps are included.

The bridges 110 are of a material with lower magnetic permeability than that of the rotor hub 102 to reduce or eliminate flux leakage through the bridges 110. The bridges 110 also are of a material with lower magnetic permeability than that of the pole portions 114. The bridges 110 are of a material including at least one of Inconel, titanium, stainless steel, or nickel. The rotor hub 104 is of a magnetic steel.

A method of producing a permanent magnet machine, e.g., permanent magnet machine 100, includes additively manufacturing a rotor, e.g., rotor 102, including a rotor hub, e.g., rotor hub 104, and a plurality of bridges, e.g., bridges 110, radially outward of the rotor hub, wherein each bridge is of a different material than that of the rotor hub, and wherein the rotor hub and bridges are additively manufactured integral with one another. In embodiments, additively manufacturing the rotor includes building the rotor up around a plurality of magnets, e.g. magnets 108, so the magnets become embedded in the rotor. It is also contemplated that in embodiments, additively manufacturing the rotor includes building the rotor up without any magnets in place, and includes embedding a plurality of magnets in the rotor after the rotor has been additively manufactured.

Relative to traditional permanent magnet machines with their flux leakage, permanent magnet machines as described herein can provide a weight and/or size advantage. So a permanent magnet machine as disclosed herein can be made smaller and/or less massive for a given power rating than a traditional permanent magnet machine, or a permanent magnet machine as described herein can be made the same size and/or mass as a traditional permanent magnet machine but have a higher power rating.

The methods and systems of the present disclosure, as described above and shown in the drawings, provide for permanent magnet machines with superior properties including reduced flux leakage compared to traditional permanent magnet machines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of producing a permanent magnet machine comprising:
    additively manufacturing a rotor including a rotor hub and a plurality of bridges radially outward of the rotor hub, wherein each bridge is of a different material than that of the rotor hub, and wherein the rotor hub and bridges are additively manufactured integral with one another, wherein additively manufacturing the rotor includes forming the rotor with a respective transition region between each bridge and the rotor hub wherein the material of the bridge transitions into that of the rotor hub; and
    embedding permanent magnets in the rotor in a circumferential pattern with a respective one of the bridges between each circumferentially adjacent pair of the permanent magnets, wherein additively manufacturing the rotor includes forming the rotor with a single transition region circumferentially between each circumferentially adjacent pair of the permanent magnets.

2. A method as recited in claim 1, wherein additively manufacturing the rotor includes building the rotor up around a plurality of magnets so the magnets become embedded in the rotor.

3. A method as recited in claim 2, wherein building up the rotor around the magnets includes building the rotor up around the magnets with no gap between the magnets and the rotor.

4. A method as recited in claim 1, wherein additively manufacturing the rotor includes building the rotor up without any magnets in place, and further comprising:
    embedding a plurality of magnets in the rotor after the rotor has been additively manufactured.

5. A method as recited in claim 1, wherein embedding the magnets in the rotor includes embedding the magnets so there is no gap between the rotor and the magnets.

6. A method as recited in claim 1, wherein additively manufacturing the rotor includes forming the bridges are of material with lower magnetic permeability than that of the rotor hub.

7. A method as recited in claim 1, wherein additively manufacturing the rotor includes forming the rotor with a respective pole portion radially outward of each permanent magnet and circumferentially between each pair of circumferentially adjacent ones of the bridges, wherein the pole portion is of a different material from the bridges.

8. A method as recited in claim 7, wherein the pole portions and the rotor hub are formed of a common material.

9. A method as recited in claim 7, wherein additively manufacturing the rotor includes forming the rotor with the material of each bridge transitioning into that of the respective pole portions.

10. A method as recited in claim 9, wherein there are two respective transition regions formed circumferentially between each pair of circumferentially adjacent pair of the pole portions.

* * * * *